(12) United States Patent
Zou et al.

(10) Patent No.: US 11,614,463 B2
(45) Date of Patent: Mar. 28, 2023

(54) HIGH PERFORMANCE MICRO-ELECTRO-MECHANICAL SYSTEMS ACCELEROMETER

(71) Applicant: Cambridge Enterprise Limited, Cambridgeshire (GB)

(72) Inventors: Xudong Zou, Beijing (CN); Ashwin Arunkuman Seshia, Cambridgeshire (GB)

(73) Assignee: CAMBRIDGE ENTERPRISE LIMITED, Cambridge (GB)

(*) Notice: Subject to any disclaimer, the term of this patent is extended or adjusted under 35 U.S.C. 154(b) by 169 days.

(21) Appl. No.: 16/608,326

(22) PCT Filed: Apr. 24, 2018

(86) PCT No.: PCT/GB2018/051068
§ 371 (c)(1),
(2) Date: Oct. 25, 2019

(87) PCT Pub. No.: WO2018/197857
PCT Pub. Date: Nov. 1, 2018

(65) Prior Publication Data
US 2020/0166537 A1     May 28, 2020

(30) Foreign Application Priority Data
Apr. 27, 2017 (GB) ..................... 1706732

(51) Int. Cl.
*G01P 15/097* (2006.01)
*G01P 15/08* (2006.01)
*G01P 15/13* (2006.01)

(52) U.S. Cl.
CPC ........ *G01P 15/097* (2013.01); *G01P 15/0802* (2013.01); *G01P 15/131* (2013.01); *G01P 2015/0882* (2013.01)

(58) Field of Classification Search
CPC .. G01P 15/097; G01P 15/0802; G01P 15/131; G01P 15/13; G01C 19/5747; G01C 19/5755; G01C 19/5726; G01C 19/5733
See application file for complete search history.

(56) References Cited

U.S. PATENT DOCUMENTS 3,238,789 A * 3/1966 Erdley ..................... H03B 5/30
                                              73/514.29
4,258,572 A * 3/1981 Loper, Jr. .............. G01P 15/097
                                              310/329

(Continued)

FOREIGN PATENT DOCUMENTS

WO    WO 2011/148137 A1    12/2011
WO    2013/076490 A1    5/2013

(Continued)

OTHER PUBLICATIONS

Etienne, Athina Nickitas; PCT/GB2018/051071; International Preliminary Report on Patentability; 12 pages; dated Nov. 7, 2019.

(Continued)

*Primary Examiner* — Helen C Kwok
(74) *Attorney, Agent, or Firm* — Todd A. Serbin; Nexsen Pruet, LLC (57) ABSTRACT

There is provided a resonant sensor comprising: a substrate; a proof mass suspended from the substrate by one or more flexures to allow the proof mass to move relative to the frame along a sensitive axis; a first and a second resonant element connected between the frame and the proof mass; wherein the proof mass is positioned between the first and the second resonant element along the sensitive axis, and wherein the first and the second resonant elements have a substantially identical structure to one another; and drive and sensing circuitry comprising: a first electrode assembly coupled to first drive circuitry configured to drive the first resonant element in a first mode; a second electrode assem- (Continued)

bly coupled to second drive circuitry configured to drive the second resonant element in a second mode, different to the first mode; and a sensing circuit configured to determine a measure of acceleration.

22 Claims, 8 Drawing Sheets

(56) References Cited

U.S. PATENT DOCUMENTS

| | | | | |
|---|---|---|---|---|
| 4,872,342 | A | * | 10/1989 | Hanson ............... G01P 15/0888 |
| | | | | 29/595 |
| 5,379,639 | A | * | 1/1995 | Hulsing, II ........... G01P 15/097 |
| | | | | 73/497 |
| 5,417,115 | A | | 5/1995 | Burns |
| 5,605,598 | A | | 2/1997 | Greiff |
| 5,969,249 | A | * | 10/1999 | Roessig ............. G01P 15/0802 |
| | | | | 73/514.15 |
| 7,954,215 | B2 | * | 6/2011 | Saito .................. G01P 15/0802 |
| | | | | 29/25.35 |
| 9,310,391 | B2 | | 4/2016 | Seshia et al. |
| 9,551,576 | B2 | | 1/2017 | Thiruvenkatanathan et al. |
| 2009/0194830 | A1 | | 8/2009 | Ransley et al. |
| 2010/0089157 | A1 | * | 4/2010 | Quer .................... G01P 15/097 |
| | | | | 73/504.12 |
| 2012/0067124 | A1 | * | 3/2012 | Zolfagharkhani .... G01P 15/097 |
| | | | | 73/579 |
| 2013/0204571 | A1 | * | 8/2013 | Savchenko ........... G01P 15/097 |
| | | | | 702/141 |
| 2013/0298670 | A1 | * | 11/2013 | Tsugai ............... G01C 19/5705 |
| | | | | 73/504.12 |
| 2013/0298675 | A1 | * | 11/2013 | Thiruvenkatanathan .................... |
| | | | | G01C 19/5755 |
| | | | | 73/504.16 |
| 2014/0305208 | A1 | * | 10/2014 | Thiruvenkatanathan .................... |
| | | | | G01P 15/097 |
| | | | | 73/504.12 |
| 2015/0226762 | A1 | * | 8/2015 | Seshia .................. G01P 15/097 |
| | | | | 73/495 |
| 2016/0139171 | A1 | * | 5/2016 | Becka .................. G01P 15/032 |
| | | | | 73/514.29 |
| 2018/0209791 | A1 | * | 7/2018 | Chang ................ G01C 19/5747 |
| 2019/0301870 | A1 | | 10/2019 | Seshia et al. |
| 2020/0096536 | A1 | * | 3/2020 | Zou ..................... G01P 15/0802 |
| 2020/0124634 | A1 | * | 4/2020 | Seshia ..................... G01P 21/00 |

FOREIGN PATENT DOCUMENTS

| | | |
|---|---|---|
| WO | 2014/037695 A2 | 3/2014 |
| WO | 2017/007428 A1 | 1/2017 |

OTHER PUBLICATIONS

Xudong, Zou, "High Resolution Resonant Accelerometer Based on MEMS Technology," University of Cambridge; Nov. 2013; 279 pages.
Zou et al., "A High Resolution Resonant MEMS Accelerometer," Nanoscience Centre, Department of Engineering, University of Cambridge, U.K.; Jun. 21-25, 2015; 4 pages.
Zou et al., "A high-resolution micro-electro-mechanical resonant tilt sensor," Sensors and Actuators A: 220 (2014) 168-177; www.elsevier.com/locate/sna; 2014; 10 pages.
Zou et al., "A Seismic-Grade Resonant MEMS Accelerometer," Journal of Microelectromechanical Systems, vol. 23, No. 4, Aug. 2014; 3 pages.
International Search Report dated Jul. 6, 2018 in PCT/GB2018/051068 (5 pages).
Seshia et al., U.S. Appl. No. 16/481,660, filed Jul. 29, 2019.
UK Intellectual Property Office Search Report dated Nov. 2, 2017 in GB 1706732.3 (3 pages).
Written Opinion dated Jul. 6, 2018 in PCT/GB2018/051071 (8 pages).

* cited by examiner

HIGH PERFORMANCE MICRO-ELECTRO-MECHANICAL SYSTEMS ACCELEROMETER

CROSS REFERENCE TO RELATED APPLICATIONS

This application is a 35 U.S.C. § 371 U.S. national phase entry of International Application No. PCT/GB2018/051068 having an international filing date of Apr. 24, 2018, which claims the benefit of GB Application No. 1706732.3 filed Apr. 27, 2017, each of which is incorporated herein by reference in its entirety.

BACKGROUND

The present invention relates to micro-electro-mechanical systems (MEMS) accelerometers, and in particular to high performance accelerometers capable of providing a high resolution measurement of acceleration suitable for low-frequency or quasi static accelerations.

Oscillators based on lightly damped microscopic mechanical resonators are well known for their ability to produce stable, low-noise frequency outputs. While these characteristics make them valuable in communication systems as stable timing/frequency references, they also make them attractive for use as sensors.

A resonant sensor, by definition, is an oscillator whose output frequency is a function of an input measurand. In other words, the output of a resonant sensor corresponds to the shift in resonant frequency of a mechanical microstructure that gets tuned in accordance to a change in a physical I chemical quantity to be measured. The quasi-digital nature of the output signal in such sensors, along with the sensitivity and stability of the frequency shifted output signals, have resulted in wide spread use of such micromachined resonant sensors for numerous applications ranging from bio-molecular and chemical diagnostics, to high-precision force, mass, strain and even charge sensing.

However, for some applications it would be desirable to provide a resonant sensor design with even greater sensitivity and stability. One such application is for measuring specific gravity, where acceleration measurements need to be very stable.

SUMMARY

In a first aspect, there is provided a resonant sensor comprising:
 a substrate;
 a proof mass suspended from the substrate by one or more flexures to allow the proof mass to move relative to the frame along a sensitive axis;
 a first resonant element connected between the frame and the proof mass;
 a second resonant element connected between the frame and the proof mass, wherein the first resonant element and the second resonant element are positioned so that the proof mass is between the first resonant element and the second resonant element along the sensitive axis, and wherein the first resonant element and the second resonant element have a substantially identical structure to one another; and
 drive and sensing circuitry comprising:
  a first electrode assembly coupled to first drive circuitry configured to drive the first resonant element in a first mode;
  a second electrode assembly coupled to second drive circuitry configured to drive the second resonant element in a second mode, different to the first mode; and
  a sensing circuit configured to determine a measure of acceleration based on changes in resonant behavior of the first and second resonant elements.

The first electrode assembly may comprise a first pair of electrodes positioned relative to the first resonant element to allow the first resonant element to be driven in both a fundamental mode and in a second order mode. Advantageously, the first pair of electrodes is positioned around the position of the antinode of the first resonant element vibrating in the second order mode.

The second electrode assembly may comprise a second pair of electrodes positioned relative to the second resonant element to allow the second resonant element to be driven in both a fundamental mode and in a second order mode. Advantageously, the second pair of electrodes is positioned around the position of the antinode of second resonant element vibrating in the second order mode.

Providing electrodes that can drive the resonant elements in different modes provides flexibility in the operation of the device.

The first and second resonant elements may take any suitable form, for example they may be single beam resonators or may be double ended tuning fork resonators.

Advantageously, each of the first and second resonant elements are connected to the proof mass through a microlever. Each microlever may amplify the force applied to the connected resonant element by the proof mass, and so improve the sensitivity of the sensor.

Each microlever may comprise a main beam extending orthogonal to the sensitive axis. The sensor may comprise stiffening beams extending between the main beam of each microlever and the proof mass, the stiffening beams extending along the sensitive axis.

The sensing circuit may be configured to provide a differential output based on a resonant frequency shift of the first resonant element and a resonant frequency shift of the second resonant element. A differential output provides for cancellation of common mode effects, for example due to temperature changes.

In one embodiment the resonant sensor further comprises a third resonant element coupled to the first resonant element and a fourth resonant element coupled to the second resonant element. The third and fourth resonant elements are advantageously not connected to the proof mass. The sensing circuit may be configured to provide a output based on a change in relative amplitude or phase of vibration between the first resonant element and the third resonant element or a change in relative amplitude or phase of vibration between the second resonant element and the fourth resonant element. The output may be a differential output based on the difference of the outputs of the sensing circuit for the first resonant element and the third resonant element relative to the outputs of the sensing circuit for the second resonant element and the fourth resonant element.

Advantageously, each of the third and fourth resonant elements are connected to the substrate through a microlever of the same structure as the microlevers connected to the first and second resonant elements. This provides mechanical symmetry which may improve the sensitivity of the output and compensate for any starting asymmetry introduced by manufacturing tolerances. Advantageously, one or more of the flexures supporting the proof mass has a serpentine shape. The one or more flexures having a serpentine shape may have a variable width such that the width of the flexure is lower in a mid-section between the substrate and the proof mass than at end-sections that are respectively connected to the substrate and the proof mass. The serpentine flexure may be formed from beam segments. The length of the beam segments may be variable such that the beam segments are longer in a mid-section between the substrate and the proof mass than at end-sections that are respectively connected to the substrate and the proof mass. This structure of flexure provides an even distribution of stress along the flexure during displacement of the proof mass and so reduces the spring hardening effect and improves the sensitivity of the sensor.

The resonant sensor may be microelectromechanical systems (MEMS) sensor. The substrate, proof mass, flexures, microlevers and first and second resonant elements may be formed from silicon, and advantageously are formed from a single crystal of silicon.

The resonant sensor may be configured as a gravity sensor.

The resonant sensor may further comprise a substrate electrode on the substrate, adjacent to the at least one proof mass; and electric circuitry connected to the substrate electrode configured to apply a voltage to the substrate electrode providing an electrostatic force on the proof mass.

The application of an electrostatic force on the proof mass can be used to provide a number of benefits.

The electric circuitry may be configured to apply an alternating calibration signal to the substrate electrode to drive the proof mass at a calibration frequency, and the resonant sensor may configured to use the response of the resonant element at the calibration frequency to calibrate the resonant sensor. The calibration signal is used to apply a known inertial force on the resonant elements so that the response, and in particular the scale factor, can be calibrated for different modes of vibration. This can be done periodically and automatically even after the sensor has been deployed in an inaccessible location.

The electric circuitry may be configured to apply a DC biasing voltage to the substrate electrode. A DC biasing voltage may pre-stress the resonant elements. This can improve the acceleration sensitivity of the sensor and reduce temperature sensitivity.

The resonant sensor may further comprise at least one additional electrode on the substrate, adjacent to the proof mass, wherein the electric circuitry is configured to apply a damping signal to the substrate electrode or the at least one additional electrode. The damping signal may be calculated based on a sensed motion of the proof mass, using signals from the substrate electrode or the at least one additional electrode. This allows the proof mass to be quickly brought back to rest following a shock, so that further measurements can be made.

In a second aspect of the invention there is provided a method of sensing acceleration using a MEMS resonant sensor, the resonant sensor comprising:

a substrate;

a proof mass suspended from the substrate by one or more flexures to allow the proof mass to move relative to the frame along a sensitive axis;

a first resonant element connected between the frame and the proof mass;

a second resonant element connected between the frame and the proof mass, wherein the first resonant element and the second resonant element are positioned so that the proof mass is between the first resonant element and the second resonant element along the sensitive axis, and wherein the first resonant element and the second resonant element have a substantially identical structure to one another;

the method comprising:

driving the first resonant element in a first mode;

driving the second resonant element in a second mode, different to the first mode; and determining a measure of acceleration of the proof mass based on changes in the resonant behavior of the both the first and second resonant elements.

The step of determining a measure of acceleration of the proof mass may comprise calculating a difference in a change in resonant frequency of the first resonant element and a change in resonant frequency of the second resonant element. This provides for cancellation of common mode effects.

The first mode may be a fundamental mode. The second mode may be a second order mode. However, the first and second modes may be higher order modes of vibration.

The step of driving the first resonant element may comprise applying a drive signal of a first frequency to the first resonant element and the step of driving the second resonant element may comprise applying a drive signal of a second frequency to the second resonant element, wherein the second frequency is different to the first frequency.

DRAWINGS

Embodiments of the invention will now be described in detail, by way of example only, with reference to the accompanying drawings, in which.

DESCRIPTION

Figure 1:
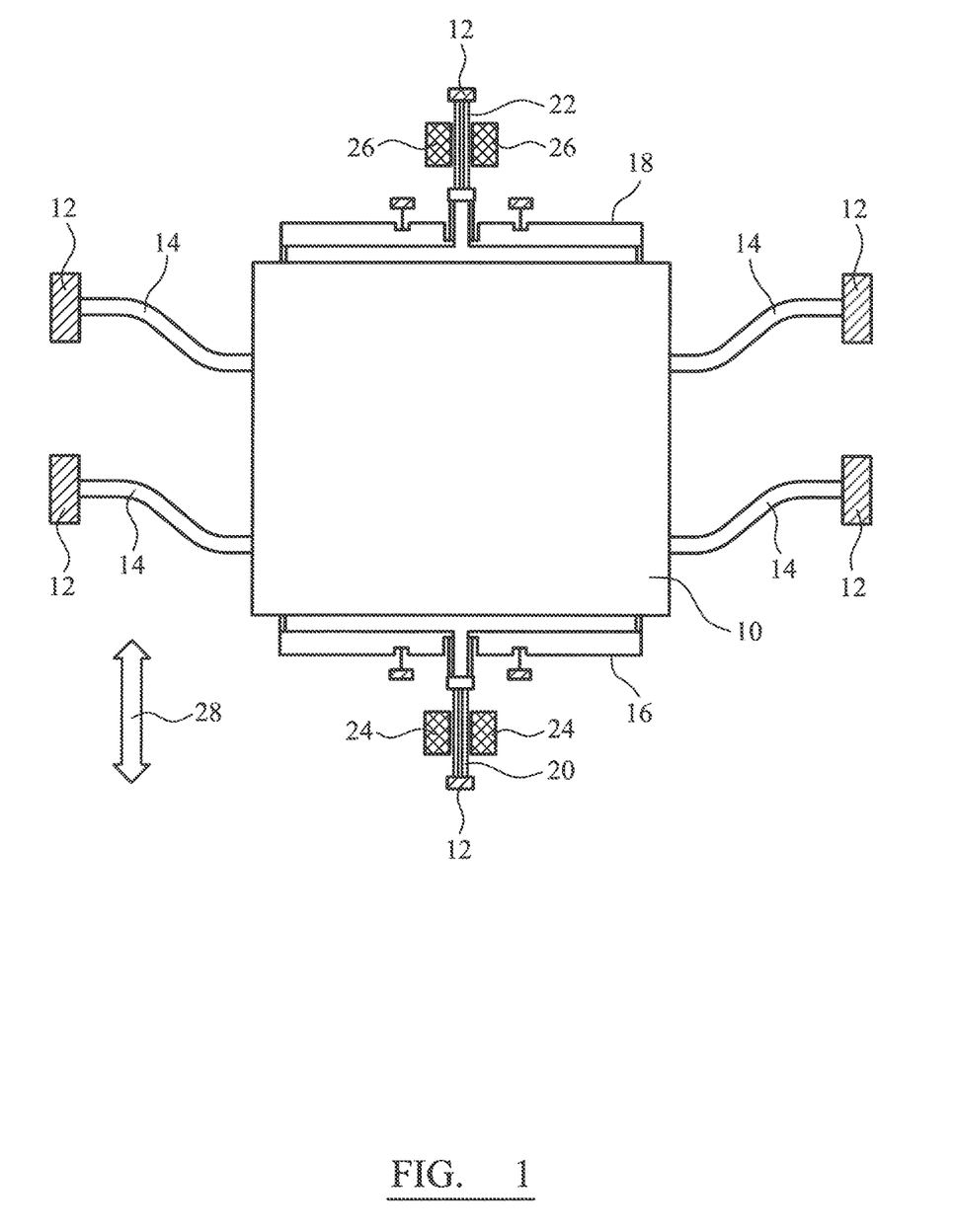
FIG. 1 is a schematic illustration of an accelerometer in accordance with a first embodiment of the invention.

FIG. 1 is a schematic illustration of an accelerometer in accordance with a first embodiment of the invention. The accelerometer is a MEMS device formed from a single crystal of silicon. The accelerometer comprises a proof mass 10 suspended from a surrounding frame or substrate 12 by a plurality of flexures 14. A first resonant element 20 is connected to one side of the proof mass 10 through amplifying lever 16. A second resonant element 22, identical to the first resonant element, is connected to an opposite side of the proof mass 10 through amplifying lever 18. In operation, the resonant elements 20, 22 are driven to resonance by the application of an alternating current to electrodes 24, 26 adjacent to the resonant elements.

The accelerometer is sensitive to acceleration along a sensitive axis, illustrated by arrow 28. The resonant elements are on opposite sides of the proof mass in the direction of the sensitive axis, and the levers 16,18 are of the same type (i.e. non-inverting or inverting) so that each resonant element experiences an opposite force as a result of acceleration of the proof mass along the sensitive axis. Amplifying levers 16 and 18, also referred to as microlevers, amplify the inertial force applied to the resonant elements as a result of displacement of the proof mass along the sensitive axis. Any acceleration of the proof mass along the sensitive axis consequently gets translated into an equal magnitude of strain on each of the oppositely positioned resonant element, but of opposite polarity. In other words, one resonant element undergoes an axial tensile stress while the other undergoes an axial compressive stress. Consequently, the induced strain on each of resonant elements results in a shift of their resonant frequency by an equal magnitude but in an opposite direction. A differential measurement from the two diametrically opposed resonant elements can then be used to provide for a first order common mode cancellation of any frequency fluctuations arising from environmental variations, such as temperature and pressure fluctuations.

Figure 2:
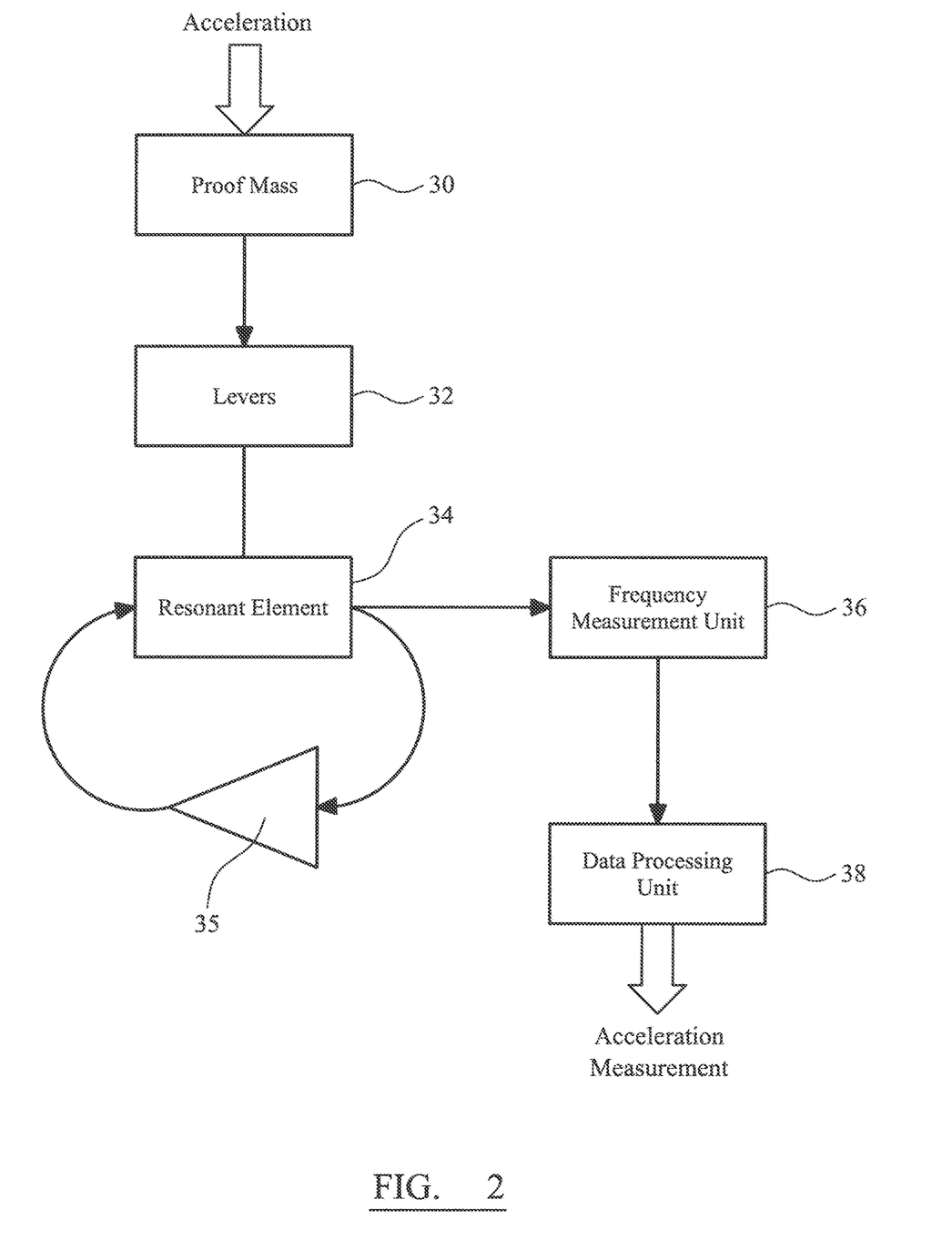
FIG. 2 is a schematic illustration of the principle of operation of a resonant accelerometer.

FIG. 2 is a schematic illustration of the basic elements and principle of operation of the resonant accelerometer shown in FIG. 1. An acceleration acts on the proof mass 30 to generate an inertial force on the sensing axis. The inertial force is amplified by the levers 32 to act on the resonant elements 34. A feedback loop, including amplifier 35 is used to maintain the resonant elements at a resonant frequency. Any change in resonant frequency is measured by frequency measurement unit 36 and processed using a data processing unit 38 to provide an output measured acceleration signal.

Figure 3:
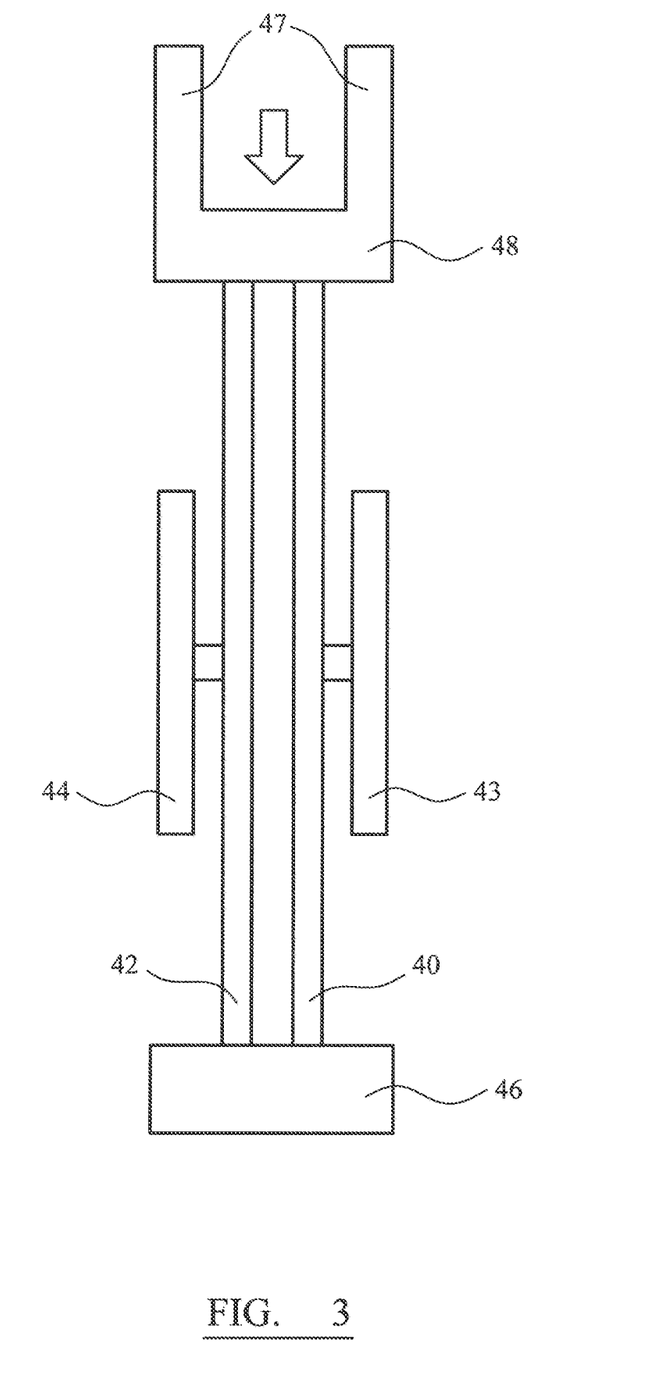
FIG. 3 is a schematic illustration of an example of a resonant element for use in the accelerometer of FIG. 2.

FIG. 3 illustrates one possible design for the resonant elements. The resonant element is double-ended tuning fork (DETF) resonator. The resonant element comprises first and second tines 40, 42 connected between a fixed anchor 46 on the frame and a floating anchor 48 which is connected to the proof mass through the levers. Elements 47 are connections to the amplifying levers. First and second electrodes 43, 44 are connected to the first and second tines 40,42 and are used to drive and sense the motion of the tines.

In order to obtain the maximum common-mode rejection of the influence of temperature, residual stress, and cross-axis vibrations, it is advantageous for the two resonant elements to have identical geometry to one another. However, if both the first and second resonant elements are driven in the same mode of vibration problems can arise. In particular, manufacturing tolerances mean that the two resonant elements will never have exactly the same resonant frequency for a given mode of vibration. The resulting currents signals from the two resonant elements will have very similar but not identical frequencies. When used together in a differential output scheme this can lead to issues such as mode-shape distortion, injection locking and signal cross-talk because of unavoidable mechanical and electrical coupling effects in the sensor.

To address this issue the accelerometer of FIG. 1 is configured to drive the two resonant elements in two different modes, having two different resonant frequencies, but using the same electrode arrangement for both resonant elements.

Figure 4:
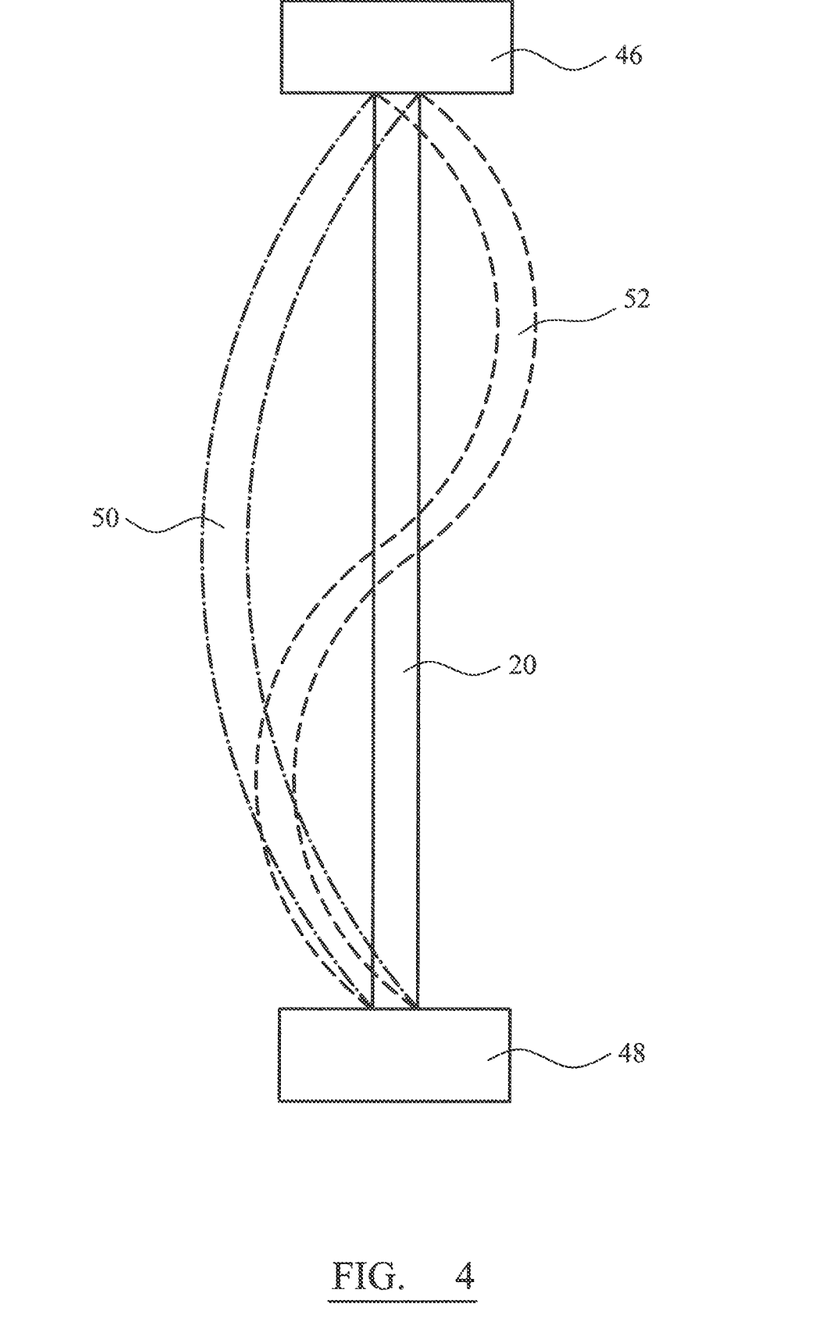
FIG. 4 is a schematic illustration of two possible mode shapes for the resonant element of FIG. 3.

In a preferred embodiment, one of the first and second resonant elements is driven to vibrate in a fundamental mode and the other of the first and second resonant elements is driven to vibrate in a second order mode. FIG. 4 schematically illustrates a resonant element 20 and the (exaggerated) shape of a fundamental mode of vibration 50 and second order mode of vibration 52. The two modes have different resonant frequencies but both can be independently excited by a single pair of adjacent drive electrodes. The electrodes are positioned so as to achieve adequate electro-mechanical coupling to both modes of vibration.

Modes other than the modes illustrated in FIG. 4 can be used and different topologies for the resonant elements may also be used. However, there is advantage to an arrangement which allows different modes to be driven using a single set of drive electrodes. This preserves the symmetry of the mechanical structure and removes any restriction on which resonant element should operate in which mode.

Different modes will give rise to different scale factors. In other words, for a given input acceleration the frequency shift of the resonant frequency of one mode will be different to the frequency shift of the resonant frequency of the other mode. The overall scale factor for the accelerometer will be the average of the two. The use of higher order modes can be advantageous because they will typically give rise to a higher scale factor than lower order modes.

The flexures that are used to suspend the proof mass from the frame may be single beam flexures. This offers good cross-axis decoupling of the acceleration. However the stiffness of single beam flexures can exhibit early onset of mechanical nonlinearity (the spring hardening effect). This means that the displacement of the proof mass will not be linear with increasing acceleration at high acceleration levels and the inertial force on the resonant elements will be relatively reduced at large displacements. To improve the sensitivity of the sensor folded flexure beams can be used. However conventional folded beam designs provide limited cross-axis decoupling, making them undesirable for a single axis accelerometer. So to improve sensitivity of the accelerometer is advantageous to use serpentine flexures to suspend the proof mass from the frame. A serpentine shape can minimize the spring hardening effect but still maintain good cross-axis decoupling.

Figure 5:
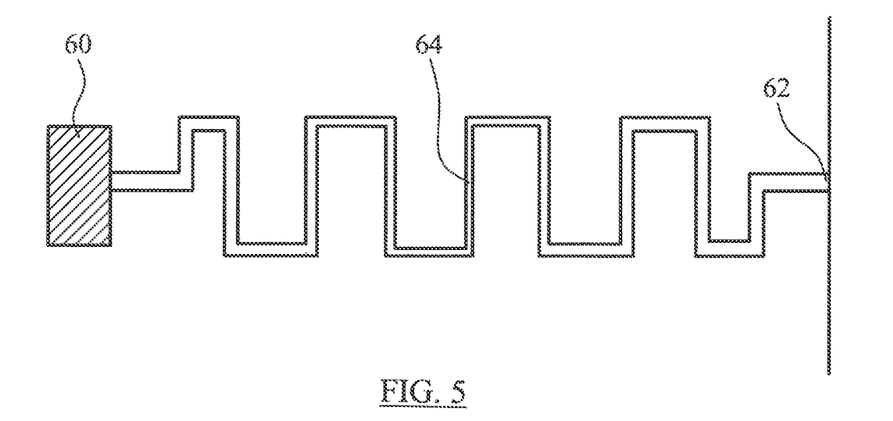
FIG. 5 is a schematic illustration of a serpentine flexure.

FIG. 5 illustrates a serpentine flexure. The flexure has a first end 60, which may be fixed to the proof mass, and a second end 62, which may be connected to the frame. The flexure consists of a number of short beam segments connecting as a snake shape. The width of each beam segment is continuously reducing from the two fixed ends 60, 62 to the central portion 64 to effectively redistribute the stress along the whole suspension under transverse load. This results in more even stress distribution on the flexure compared to the single beam suspension under the same load. Also, if the length of each beam segment is short, the "snake shape" maintains the good cross-axis decoupling 15 effectiveness. In the example shown in FIG. 5, the beam width is 5 μm at the fixed ends 60, 62 and reduces to 2 μm in the central region 64. The length of each beam segment increases towards the central region, with the length of the segments at the fixed ends being 20 μm and increasing to 40 μm in the central region. The interior corners of the serpentine flexure are also filleted to reduce concentration of stress at the corners.

In order to further improve cross-axis decoupling, a link beam may be added between the proof mass and a main beam of each microlever, extending parallel to the sensitive axis. Each link beam may be located close to the input beam connecting the main beam of the respective microlever to the proof mass.

Figure 6A:
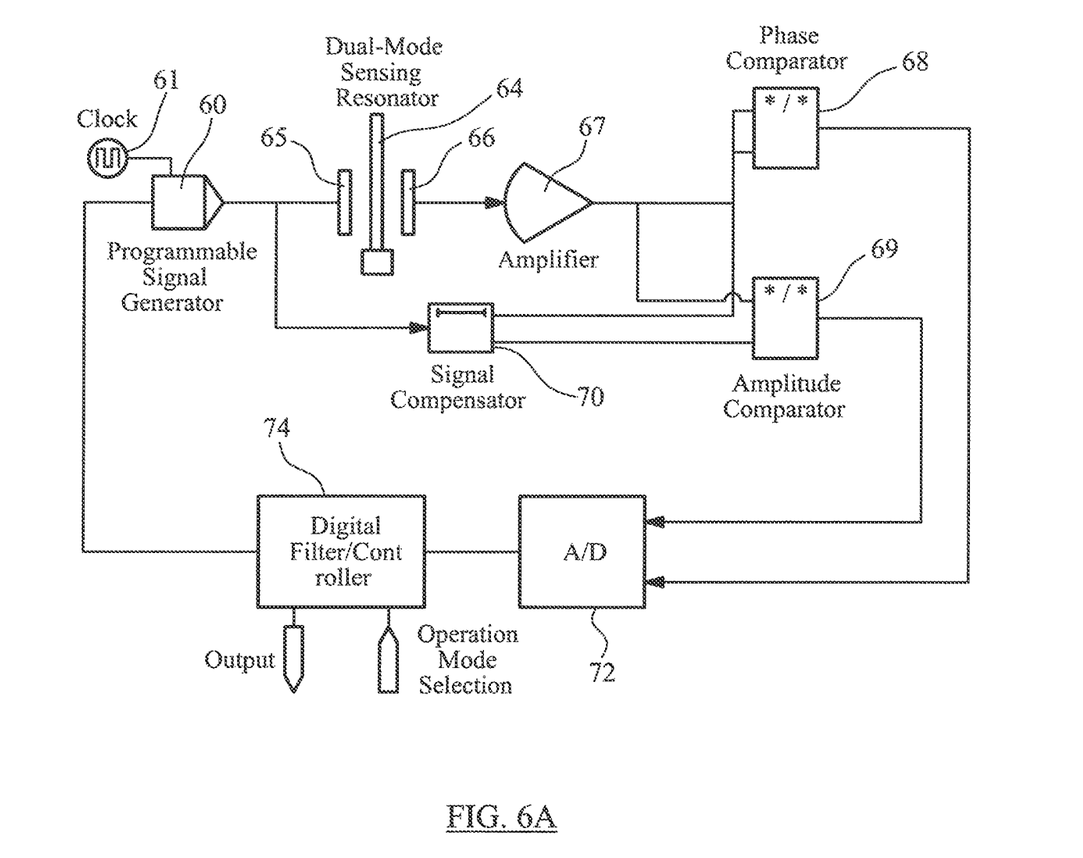
FIG. 6a is an illustration of one drive and sensing circuit for use with the accelerometer of FIG. 2.

In order to drive each of the resonant elements in a different mode and detect changes in resonant frequency, drive and sense circuitry is required. FIG. 6A illustrates a first example of a drive and measurement circuit, which can be used for both resonant elements.

The circuit comprises a variable frequency signal source 60. The variable frequency signal source in this embodiment comprises a direct digital synthesizer (DDS) chip. The variable frequency signal source in this embodiment comprises a local oscillator as a reference clock signal 61. The variable frequency signal source is connected to a first port of the resonant sensor 64, which is a first electrode 65 adjacent to one of the resonant elements.

The response or output from the sensor can be read from a second electrode 66 adjacent the resonant element.

The system comprises an amplifier 67, to which the second electrode 66 is connected. An output of the amplifier is connected to a phase comparator 68.

A signal compensator 70 is connected between the variable frequency signal source 60 and the phase comparator 68. The signal compensator 70 introduces a phase shift that compensates for phase shifts that arise in the signal path through the resonant sensor and to the phase comparator. The amount of phase shift can be calibrated in a set up procedure.

The phase comparator 68 compares the phase of the signal from the amplifier 67 and the signal compensator. The output of the phase comparator is a quasi-DC voltage output proportional to the relative phase difference. This relative phase difference is indicative of a difference between the frequency of the input signal and the resonant frequency of the resonant sensor in the existing conditions. The resonant frequency of the resonant sensor is dependent on the input acceleration.

The circuit comprises an analogue-to-digital convertor (ADC) 72 to convert the output from the phase comparator to a digital signal suitable for the microcontroller 74.

The microcontroller 74 receives the signal from the ADC 72. The value of the signal from the ADC is indicative of how close the frequency of the signal from the variable frequency signal source is to the resonant frequency of the resonant sensor. The microcontroller 74 is connected to the variable frequency signal source. In a closed loop mode, signals from the microcontroller are used to change the frequency of the input signals generated by the variable frequency signal source. Shifts in the resonant frequency of the resonant sensor provide a measure of a change in acceleration.

The circuit of FIG. 6A also includes an amplitude comparator connected to both the amplifier 67 and the signal compensator 70. The output of the amplitude comparator is input to the ADC 72 and then to the microcontroller 74. The output from the amplitude comparator may be used when the resonant sensor has an amplitude response indicative of the input measurand. For example, the resonant sensor may be a mode-localization sensor comprising two weakly coupled resonant elements, one of which is exposed to the inertial force resulting from an acceleration, as will be described with reference to FIG. 7, in which the amplitude ratio between the output of the resonant sensor and second input signal is indicative of the input measurand.

The circuit shown in FIG. 6A can operate in closed loop and open loop modes. In closed loop mode, the frequency of the input signals is adjusted based on instructions from the microcontroller in order to synchronize with the resonant frequency of the resonant sensor. In the open loop mode, the microcontroller does not feedback to the variable frequency signal source. Instead, the frequency of the input signal is fixed and a measurement is taken by the microcontroller. Initially, the system operates in the closed loop mode to fix onto a resonant frequency for the mode of choice. The open loop mode can then be use to provide a high sensitivity measurement, for example using lock-in detection techniques.

Two circuits of the type shown in FIG. 6A may be provided, one for each of the resonant elements, so that a first resonant element can be driven in a first mode and a second resonant element can be driven in a second mode. A difference between the output frequency shifts from each circuit, which will be of opposite sign, may be used to provide a measure of the acceleration experienced by the accelerometer and to cancel common mode effects.

Figure 6B:
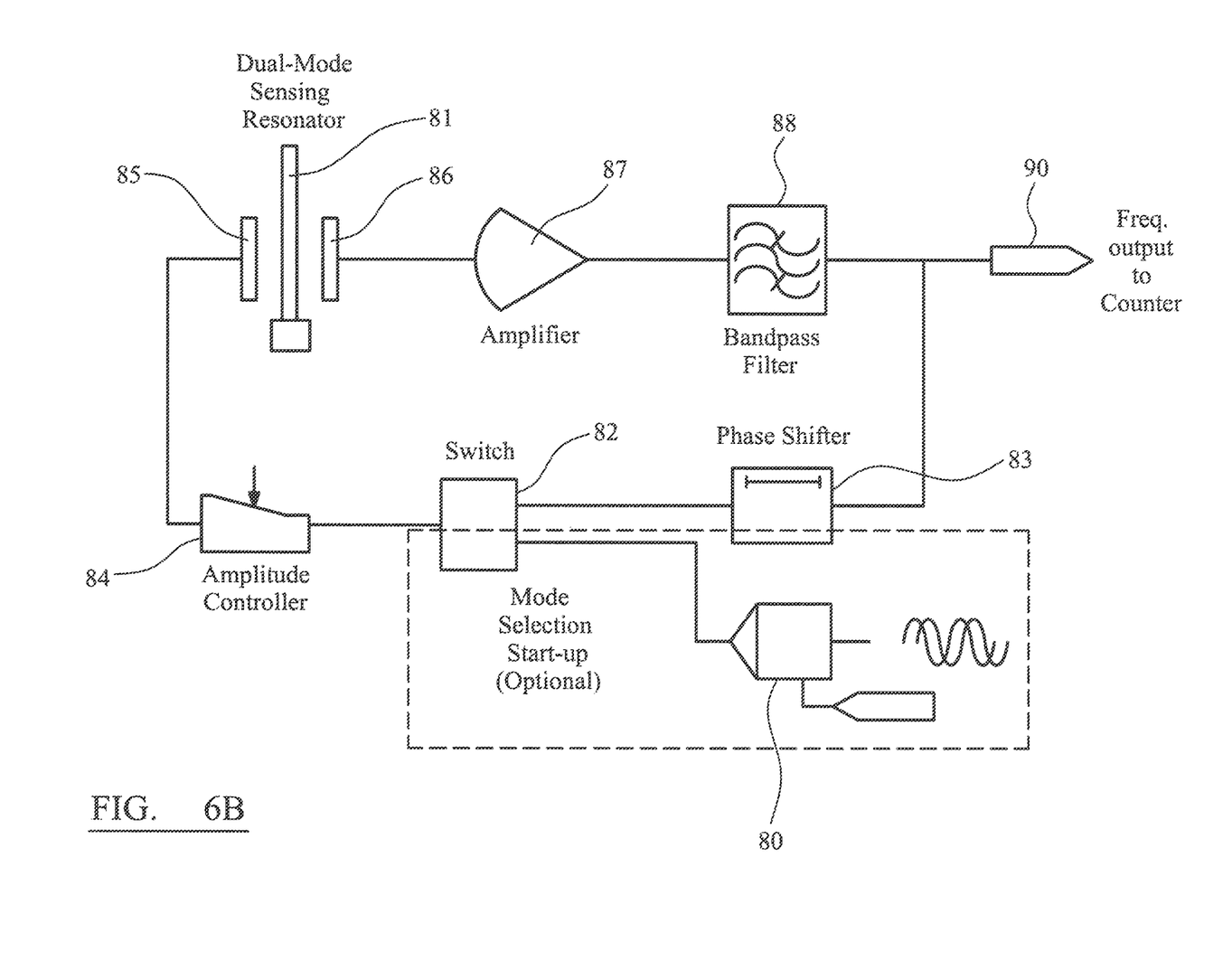
FIG. 6b is an illustration of another drive and sensing circuit for use with the accelerometer of FIG. 2.

FIG. 6B is an alternative drive and sense circuit, which is essentially an oscillator circuit. In the circuit of FIG. 6b a variable frequency signal source 80 is provide an initial signal, the frequency of which selects a mode of vibration for the resonant element. The output of the variable frequency signal source 80 is applied to the drive electrode 85 through an amplitude controller 84 which may be a variable voltage divider. The output of the resonant sensor from electrode 86 is input to an amplifier 87 and then through a bandpass filter 88. The output of the bandpass filter is the circuit output which may be sent to a frequency counter to determine changes in the resonant frequency of the resonant element. The output of the bandpass filter is fed back to the input electrode 85 through a phase shifter 83 and the amplitude controller 84 to lock on to a resonant frequency of the resonant element. Switch 82 is provided so that the input to the input electrode 85 can be switched from the variable frequency signal source 80 to the feedback signal from the phase shifter 83 once oscillation of the resonant element has been established.

Two circuits of the type shown in FIG. 68 may be provided, one for each of the resonant elements, so that a first resonant element can be driven in a first mode and a second resonant element can be driven in a second mode. The output frequency shifts from each circuit may be combined together to provide a measure of the acceleration experienced by the accelerometer.

Figure 7:
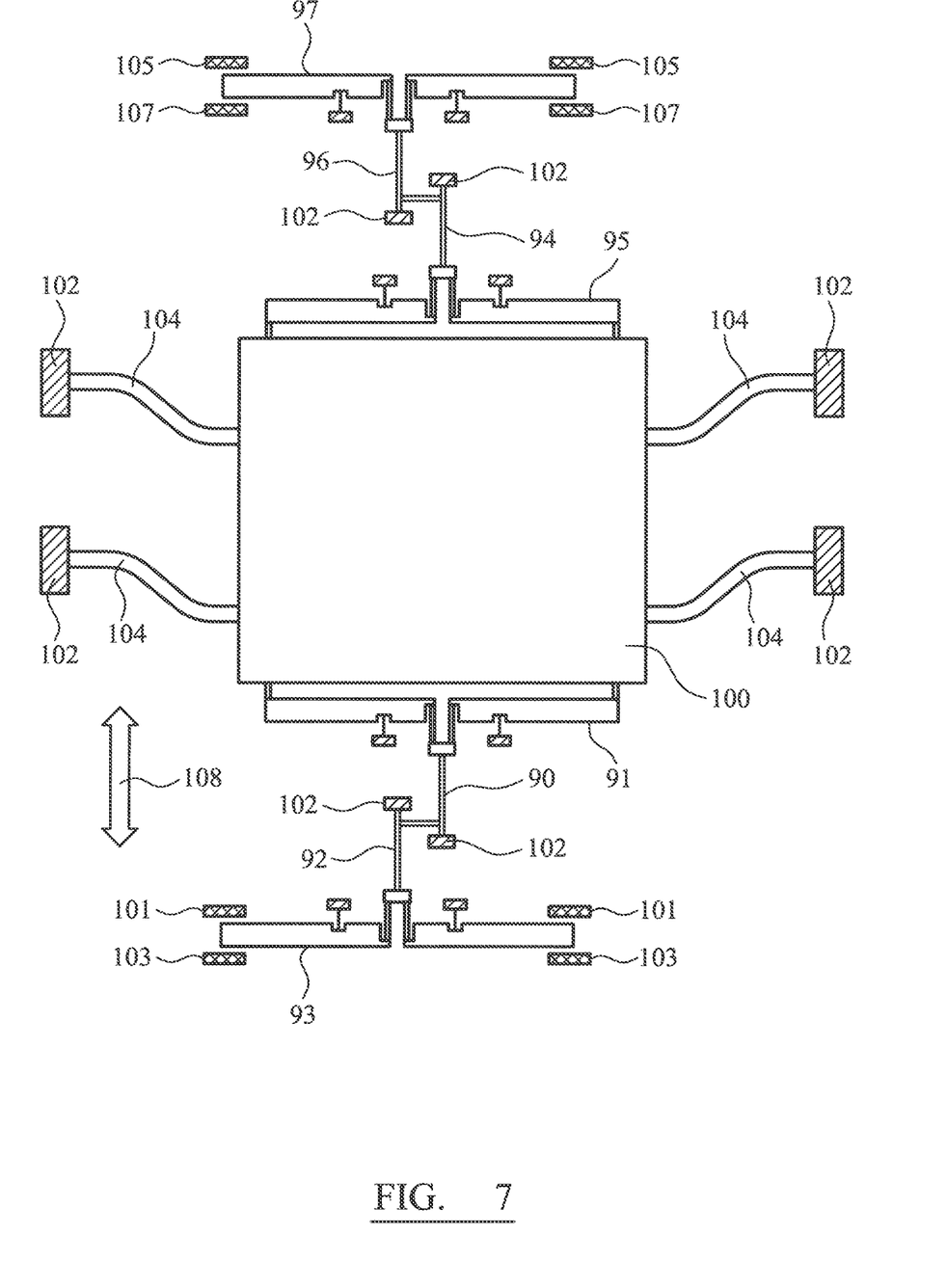
FIG. 7 is a schematic illustration of a modified accelerometer of the type shown in FIG. 2, exploiting mode localization.

FIG. 7 illustrates a further embodiment of the invention that exploits mode localization in two weakly coupled resonant elements. The embodiment of FIG. 7 is also a MEMS device formed form a single crystal of silicon using well known MEMS fabrication techniques.

The accelerometer comprises a proof mass 100 suspended from a frame or substrate 104 by a plurality of flexures 102. The flexures may have a serpentine shape as described with reference to FIG. 5.

The sensor comprises two pairs of resonant elements 90, 92 and 94, 96, which in this example are again double ended tuning forks (DETFs). A first resonant element 90 is connected to one side of the proof mass 100 through amplifying lever 91 and to the substrate 104. A second resonant element 92, identical to the first resonant element, is coupled to the first resonant element 90 by a mechanical coupling. The second resonant element is connected on one end to the substrate 104 and at the other end to an amplifying lever 93, identical to the amplifying lever 91, but not to the proof mass. This provides structural symmetry between the first and second resonant elements.

On an opposite side of the proof mass 100 there is an identical arrangement of resonant elements 94, 96 and microlevers 95, 97.

Drive electrodes are provided adjacent to the resonant elements in the same manner as for the embodiment of FIG. 1. In operation, the resonant elements 20, 22 are driven to resonance by the application of an alternating voltage to the drive electrodes.

The mechanical coupling between the resonant elements in each pair is only a weak coupling. When two vibrating resonant elements are weakly coupled in this way, any change in stiffness of one resonant element relative to the other leads to significant changes in the relative amplitude of vibration of the two coupled resonators. This phenomenon is called mode localization and explained in detail in WO2011/148137.

The sensing circuit may be configured to provide a output based on a change in relative amplitude of vibration between the first resonant element 90 and the second resonant element 92 or a change in relative amplitude of vibration between the third resonant element 94 and the fourth resonant element 96. The amplitude of one of the resonant elements in each pair may be controlled to remain constant using a feedback control and changes in the amplitude of the other resonant element in the pair used as an output. A circuit as shown in FIG. 6A, having an amplitude comparator, may be used to provide the output.

The first resonant element 90 may be driven in a fundamental mode and the amplitude of the second resonant element 92 detected. The third resonant element 94 may be driven in a second order mode and the amplitude of the fourth resonant element 96 detected. Because the output from each pair of resonant elements is already differential in nature, common mode effects are already removed. So the output from just one pair of resonant elements may be used alone. However, a differential output or combined output using both pair of resonant elements, when they are driven in different modes, may be used to provide greater rejection to common mode effects in the presence of large common-mode background or to account for limitations in common-mode rejection due to asymmetries introduced by manufacturing tolerances.

Figure 8:
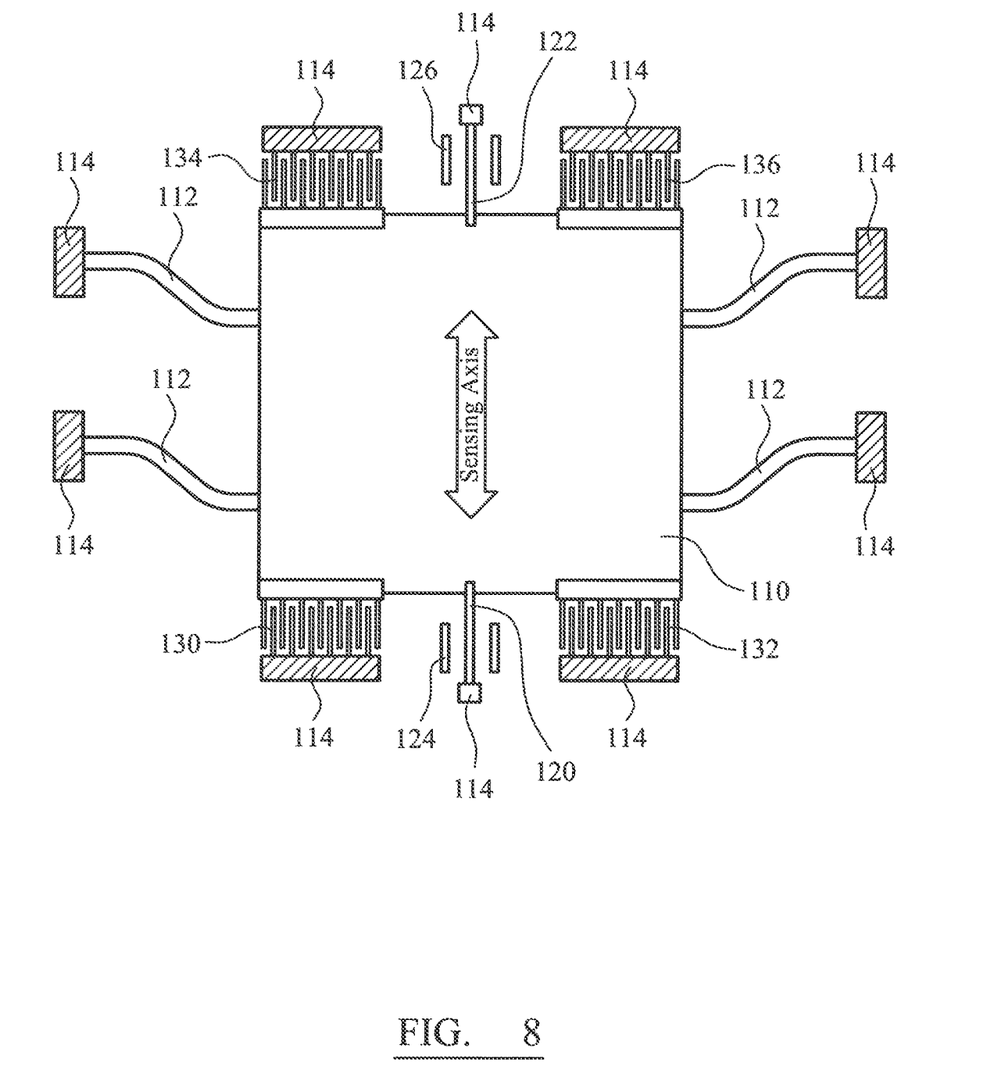
FIG. 8 is a schematic illustration of the placement of electrodes on the substrate and proof mass.

FIG. 8 is a schematic drawing illustrating the use of electrodes on the substrate and the proof mass in a resonant sensor in accordance with the invention. The basic arrangement of the sensor of FIG. 8 is the same as the sensor shown in FIG. 1. The accelerometer is a MEMS device formed from a single crystal of silicon. The accelerometer comprises a proof mass 110 suspended from a surrounding frame or substrate 114 by a plurality of flexures 112. A first resonant element 120 is connected to one side of the proof mass 110 through amplifying lever (not shown). A second resonant element 122, identical to the first resonant element, is connected to an opposite side of the proof mass 110 through amplifying lever (not shown). In operation, the resonant elements 120, 122 are driven to resonance by the application of an alternating current to electrodes 124, 126 adjacent to the resonant elements.

The resonant elements are on opposite sides of the proof mass in the direction of the sensitive axis. Any acceleration of the proof mass along the sensitive axis consequently gets translated into an equal magnitude of strain on each of the oppositely positioned resonant element, but of opposite polarity. A differential measurement from the two resonant elements can then be used to provide for a first order common mode cancellation of any frequency fluctuations arising from environmental variations, such as temperature and pressure fluctuations.

In addition four sets of comb electrodes 130, 132, 134, 136 are provided, with one half of each set of electrodes fixed to the substrate 114 and the other half fixed to the proof mass 110.

The comb electrodes (although other arrangements of electrode may be used) can be operated to provide various different functions.

A first function of the comb electrodes is to allow for automatic calibration of the sensor. One or more of the calibration electrodes may be used to force the proof mass to vibrate at a known frequency and amplitude. This is achieved by applying a predetermined calibration signal to the substrate side of the electrode set. This will force the proof mass to vibrate along the sensitive axis of the sensor with a known amplitude and frequency. The resonant elements can be driven at a resonant frequency, as described with reference to FIG. 1. The maximum change in the resonant frequency of each resonant element can then be measured and recorded to derive the scale factor of the sensor. The process may be repeated for different modes of vibration of the resonant elements, to derive the scale factor for each mode of vibration.

This calibration process can be carried out automatically even after the sensor has been deployed. For example, a gravity sensor in accordance with the invention may be deployed down an oil or gas bore hole, and so may be inaccessible to technicians. The provision of the comb electrodes allows for automated and remote calibration to be performed.

The comb electrodes illustrated in FIG. 8 can also be used to apply a static bias to the proof mass along the sensitive axis, thereby applying a static strain on the resonant elements. This can reduce the temperature sensitivity of the sensor and increase the acceleration sensitivity, at the expense of linear dynamic range.

The comb electrodes 130, 132, 134, 136 can also be used to provide active damping of the proof mass. One or more of the sets of comb electrodes can be used to sense oscillation to the proof mass, and one or more of the other sets of comb electrodes may then apply a damping signal, out of phase with the oscillation of the proof mass, to damp the proof mass. The damping signal may have a decaying amplitude, corresponding to the reduced amplitude of vibration of the proof mass. This damping process may be carried out automatically when a sensed amplitude of vibration of the proof mass exceeds a threshold limit. Damping the proof mass in this way allows for accurate measurements to be taken quickly even after the sensor has experienced a shock.

It should be clear that features and aspects described in relation to each embodiment of 5 the invention may be applied to other embodiments of the invention.

The invention claimed is:

1. A resonant sensor comprising:
   a substrate;
   a proof mass suspended from the substrate by one or more flexures to allow the proof mass to move relative to the substrate along a sensitive axis;
   a first resonant element connected between the substrate and the proof mass;
   a second resonant element connected between the substrate and the proof mass, wherein the first resonant element and the second resonant element are positioned so that the proof mass is between the first resonant element and the second resonant element along the sensitive axis, and wherein the first resonant element and the second resonant element have an identically designed resonating structure to one another; and
   a drive and sensing circuitry comprising:
   a first electrode assembly coupled to a first drive circuit configured to drive the first resonant element in a first mode;
   a second electrode assembly coupled to a second drive circuit configured to drive the second resonant element in a second mode, different to the first mode; and a sensing circuit configured to determine a measure of acceleration based on changes in a resonant behavior of the first and second resonant elements;

wherein the first and second resonant elements are single beam resonators or double ended tuning fork resonators; and wherein the first and second resonant elements each extend in a direction parallel to the sensitive axis.

2. The resonant sensor according to claim 1, wherein the first electrode assembly comprises a first pair of electrodes positioned relative to the first resonant element to allow the first resonant element to be driven in both a fundamental mode and in a second order mode.

3. The resonant sensor according to claim 2, wherein the first pair of electrodes is positioned around a position of an anti node of the first resonant element vibrating in the second order mode.

4. The resonant sensor according to claim 2, wherein the second electrode assembly comprises a second pair of electrodes positioned relative to the second resonant element to allow the second resonant element to be driven in both a fundamental mode and in a second order mode.

5. The resonant sensor according to claim 4, wherein the second pair of electrodes is positioned around a position of an anti node of the second resonant element vibrating in the second order mode.

6. The resonant sensor according to claim 1, wherein each of the first and second resonant elements are connected to the proof mass through a microlever.

7. The resonant sensor according to claim 6, wherein each microlever comprises a main beam extending orthogonal to the sensitive axis.

8. The resonant sensor according to claim 7, further comprising a stiffening beam extending between the main beam of each microlever and the proof mass, the stiffening beam extending along the sensitive axis.

9. The resonant sensor according to claim 1, wherein the sensing circuit is configured to provide a differential output based on a resonant frequency shift of the first resonant element and a resonant frequency shift of the second resonant element.

10. The resonant sensor according to claim 1, further comprising a third resonant element coupled to the first resonant element and a fourth resonant element coupled to the second resonant element, and wherein the sensing circuit is configured to provide a differential output based on a change in relative amplitude or phase of vibration between the first resonant element and the third resonant element and a change in relative amplitude or phase of vibration between the second resonant element and the fourth resonant element.

11. The resonant sensor according to claim 1, wherein one or more of the flexures has a serpentine shape.

12. The resonant sensor according to claim 11, wherein the one or more serpentine shape flexures has a variable width such that a width of the serpentine flexure is lower in a mid-section between the substrate and the proof mass than at end-sections that are respectively connected to the substrate and the proof mass.

13. The resonant sensor according to claim 1, wherein the resonant sensor is microelectromechanical systems (MEMS) sensor.

14. The resonant sensor according to claim 1, wherein the substrate, the proof mass, the flexures and the first and second resonant elements are formed from silicon.

15. The resonant sensor according to claim 1, wherein the resonant sensor is configured as a gravity sensor.

16. The resonant sensor according to claim 1, further comprising a substrate electrode on the substrate, adjacent to the proof mass; and an electric circuitry connected to the substrate electrode configured to apply a voltage to the substrate electrode providing an electrostatic force on the proof mass.

17. The resonant sensor according to claim 16, wherein the electric circuitry is configured to apply an alternating calibration signal to the substrate electrode to drive the proof mass at a calibration frequency, and wherein the resonant sensor is configured to use a change in the resonant frequency of the first and second resonant elements at the calibration frequency to calibrate the resonant sensor.

18. The resonant sensor according to claim 16, wherein the electric circuitry is configured to apply a DC biasing voltage to the substrate electrode.

19. The resonant sensor according to claim 16, further comprising at least one additional electrode on the substrate, adjacent to the proof mass, wherein the electric circuitry is configured to apply a damping signal to the substrate electrode or the at least one additional electrode.

20. The resonant sensor according to claim 1, wherein the second drive circuit is not configured to drive the second resonant element in the first mode.

21. A method of sensing acceleration using a MEMS resonant sensor, the resonant sensor comprising:

a substrate;

a proof mass suspended from the substrate by one or more flexures to allow the proof mass to move relative to the substrate along a sensitive axis;

a first resonant element connected between the substrate and the proof mass;

a second resonant element connected between the substrate and the proof mass, wherein the first resonant element and the second resonant element are positioned so that the proof mass is between the first resonant element and the second resonant element along the sensitive axis, and wherein the first resonant element and the second resonant element have an identically designed resonating structure to one another;

wherein the first and second resonant elements are single beam resonators or double ended tuning fork resonators; and wherein the first and second resonant elements each extend in a direction parallel to the sensitive axis;

the method comprising:

driving the first resonant element in a first mode;

driving the second resonant element in a second mode, different to the first mode; and determining a measure of acceleration of the proof mass based on changes in a resonant behavior of the both the first and second resonant elements.

22. The method according to claim 21, wherein the first mode is a fundamental mode of vibration and the second mode is a second order mode of vibration.

* * * * *